United States Patent
Sastry et al.

(10) Patent No.: US 8,701,168 B2
(45) Date of Patent: Apr. 15, 2014

(54) METHOD AND APPARATUS FOR ASSOCIATING A DIGITAL CERTIFICATE WITH AN ENTERPRISE PROFILE

(75) Inventors: Hari V. N. Sastry, San Jose, CA (US); Dipankar Thakuria, Cupertino, CA (US); Quan H. Dinh, Castro Valley, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1279 days.

(21) Appl. No.: 11/285,518

(22) Filed: Nov. 21, 2005

(65) Prior Publication Data
US 2007/0118892 A1    May 24, 2007

(51) Int. Cl.
*G06F 7/04*    (2006.01)

(52) U.S. Cl.
USPC .............. 726/6; 726/1; 726/2; 726/3; 726/4; 726/5; 726/7; 726/8; 726/9; 726/10; 380/247; 380/248; 380/249; 380/250; 709/225

(58) Field of Classification Search
USPC .............. 726/1–10; 709/225; 380/247–250
See application file for complete search history.

(56) References Cited

U.S. PATENT DOCUMENTS

| | | | | |
|---|---|---|---|---|
| 6,108,788 A | * | 8/2000 | Moses et al. | 713/155 |
| 6,324,645 B1 | * | 11/2001 | Andrews et al. | 713/157 |
| 6,807,577 B1 | * | 10/2004 | Gillespie et al. | 709/227 |
| 7,281,263 B1 | * | 10/2007 | LaMastres et al. | 726/2 |
| 7,434,253 B2 | * | 10/2008 | Crall et al. | 726/10 |
| 7,581,106 B1 | * | 8/2009 | Das et al. | 713/176 |
| 2002/0073308 A1 | * | 6/2002 | Benantar | 713/155 |
| 2002/0161766 A1 | * | 10/2002 | Lawson et al. | 707/9 |
| 2004/0243520 A1 | * | 12/2004 | Bishop et al. | 705/75 |
| 2005/0027987 A1 | * | 2/2005 | Neufeld et al. | 713/176 |
| 2005/0086468 A1 | * | 4/2005 | Meandzija et al. | 713/156 |
| 2005/0144463 A1 | * | 6/2005 | Rossebo et al. | 713/185 |
| 2005/0268327 A1 | * | 12/2005 | Starikov | 726/1 |

* cited by examiner

*Primary Examiner* — Edan Orgad
*Assistant Examiner* — Roderick Tolentino
(74) *Attorney, Agent, or Firm* — Shun Yao; Park, Vaughan, Fleming & Dowler LLP

(57) ABSTRACT

One embodiment of the present invention provides a system that associates a digital certificate with an enterprise profile. During operation, an identity store receives a digital certificate from a client. Next, the identity store searches for a mapping rule which determines if an enterprise profile is associated with the digital certificate, wherein the enterprise profile facilitates in identifying user capabilities. If a mapping rule is found, the identity store executes the mapping rule to determine if an enterprise profile is associated with the digital certificate. If so, the enterprise profile, which is associated with the digital certificate, is returned to the client.

20 Claims, 8 Drawing Sheets

METHOD AND APPARATUS FOR ASSOCIATING A DIGITAL CERTIFICATE WITH AN ENTERPRISE PROFILE

BACKGROUND

1. Field of the Invention

The present invention relates to digital certificates. More specifically, the present invention relates to a method and apparatus for associating a digital certificate with an enterprise profile.

2. Related Art

In conventional security systems for computer systems, a user's capabilities are typically tied to the identity of the user. This identity is often established by examining a digital certificate that the user presents to the system. The system then uses some type of mechanism to reconcile the capabilities that the user should be granted with the identity of the user. In an enterprise, the process of identifying the capabilities that for a user is typically repeated for every system that the user accesses within the enterprise. This is taxing on the enterprise's system resources because a similar capability-granting process must take place repeatedly as the user accesses different computer systems within the enterprise.

Moreover, a system developer must deploy and configure a capability-granting system for each system within the enterprise. Furthermore, if the enterprise needs to change how capabilities are granted, a system developer must implement the change in each system. Additionally, because capability granting is an important aspect of computer security, each system must be carefully designed and monitored to ensure that a breach of security does not occur.

Multiple certificate authorities are typically used to generate digital certificates. This means that each system within the enterprise system that grants capabilities based on a user's digital certificate must be designed to recognize a digital certificate from any of several certificate authorities, thereby increasing the workload for the system developer.

Hence, what is needed is a method and apparatus for mapping a user's capabilities to a digital certificate without the above-described problems.

SUMMARY

One embodiment of the present invention provides a system that associates a digital certificate with an enterprise profile. During operation, an identity store receives a digital certificate from a client. Next, the identity store searches for a mapping rule which determines if an enterprise profile is associated with the digital certificate, wherein the enterprise profile facilitates in identifying user capabilities. If a mapping rule is found, the identity store executes the mapping rule to determine if an enterprise profile is associated with the digital certificate. If so, the enterprise profile, which is associated with the digital certificate, is returned to the client.

In a variation of this embodiment, the method further comprises authenticating a user at a certificate authority. The certificate authority then generates a digital certificate. After the digital certificate is generated, the certificate authority distributes the digital certificate.

In a further variation, the certificate authority sends the digital certificate to the identity store. The certificate authority then sends the user's identifying information to the identity store, wherein the user's identifying information facilitates in associating/mapping the digital certificate to the enterprise profile.

In a further variation, the certificate authority sends a key field's or extension's value to the identity store, wherein the key field's or extension's value facilitates in identifying the enterprise profile associated with the digital certificate. The certificate authority then sends the user's identifying information to the identity store, wherein the user's identifying information facilitates in associating/mapping the digital certificate to the enterprise profile.

In yet a further variation, the key field can include a standard digital certificate field, or a standard/custom extension created specifically for use by the identity store.

In yet a further variation, the method comprises generating a hash of the digital certificate at the identity store, to facilitate in identifying the enterprise profile associated with the digital certificate.

In a variation of this embodiment, the method further comprises the receiving a digital certificate-parsing rule from an administrator at the identity store. The identity store then receives a digital certificate-querying rule from an administrator. The digital certificate-parsing rule and the digital certificate-querying rule facilitate in identifying the enterprise profile associated with the digital certificate.

In a variation of this embodiment, the mapping rule can refer to a second mapping rule.

DETAILED DESCRIPTION

Figure 1:
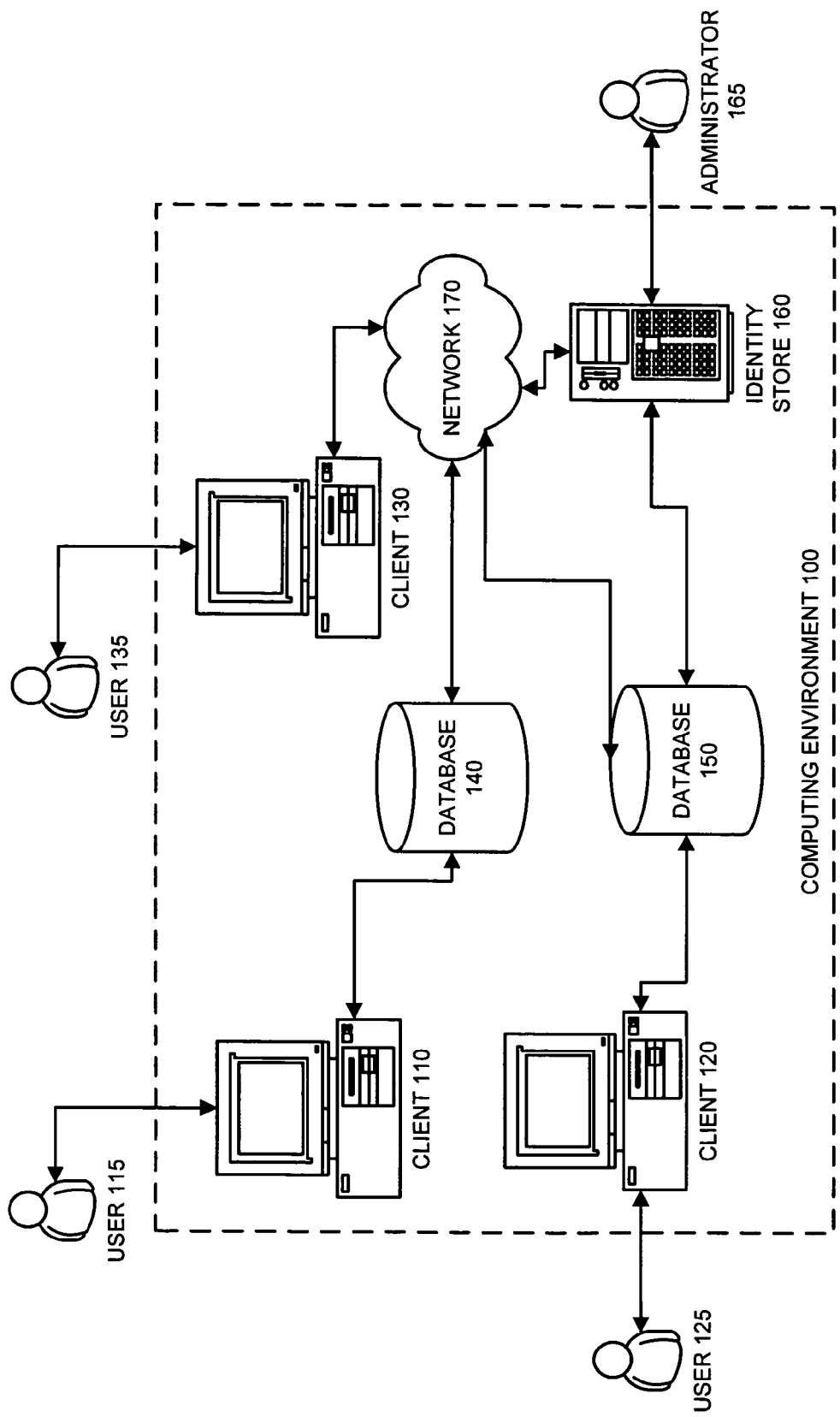
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Overview

The present invention provides a method for mapping or associating a digital certificate to an enterprise profile, wherein the enterprise profile is used for assigning capabilities to a user within the enterprise. Typically, different capabilities are assigned to different users. To identify the capabilities that should be available to a user when the user logs into a system, a profile is mapped to a user identifier (typically a login name). Note that the present invention does not require an enterprise profile; the present invention alternatively can function with a user profile, a capability list, or anything else that an administrator may desire to map to a digital certificate.

In one embodiment of the present invention, a digital certificate is mapped to a capability. In another embodiment of the present invention, the capability is encoded in the digital certificate. In such an embodiment, the present invention provides a framework for parsing the digital certificate and retrieving the encoded capability.

The present invention can be adapted to use any authentication-determining service, but the embodiments presented below will only be described in terms of a certificate authority.

The system uses a user's digital certificate to determine the identity of the user, and to identify what capabilities the user is granted. A certificate authority authenticates the user and provisions a digital certificate to the user, which identifies the user. The digital certificate is also provisioned to an "identity store," which is part of the enterprise system.

In another embodiment of the present invention, the digital certificate is not provisioned to the identity store. Instead, certain administrator-selected key field values are provisioned to the identity store. These key field values can be standard digital certificate fields, or they can be specially defined fields for the present invention.

If the user is authenticated, the administrator maps the user's newly assigned digital certificate to an "enterprise user profile," which specifies the capabilities that are assigned to the user. This authentication step helps prevent a user from posing as another user.

During operation, when a user logs into a system, the user's digital certificate is sent to the identity store. The identity store then searches each mapping rule that has been predefined by an administrator until it finds the first mapping rule whose criteria matches that of the newly received digital certificate.

Using the matching mapping rule, an enterprise profile is retrieved from the identity store. The enterprise profile is then sent to the system that the user is logging into. Based on the received profile, the system can control the capabilities of the user.

In one embodiment of the present invention, one or more capabilities are sent to the system that the user is logging into.

If a mapping rule is not found or if an enterprise profile is not found based on the user's digital certificate and the matching mapping rule then, if configured, the system executes a hash/exact match rule, and if the result still does not return any enterprise profile, then the identity store returns a message indicating that the user cannot be found in the system identity store.

The present invention is advantageous because it is centralized and flexible. Furthermore, the framework is easily adopted by new systems, thus each individual system does not need to possess its own mechanism for mapping digital certificates to profiles.

In one embodiment of the present invention, a system can be configured to use just matching rules, just mapping rules, or both matching and mapping rules, wherein matching rules refer to the hash/exact mapping rules. If a system is configured to use both matching and mapping rules, the mapping rules take precedence and are executed first.

Computing Environment

FIG. 1 illustrates a computing environment 100 in accordance with an embodiment of the present invention. Computing environment 100 can generally include any type of computer system, including, but not limited to, a computer system based on a microprocessor, a mainframe computer, a digital signal processor, a portable computing device, a personal organizer, a device controller, and a computational engine within an appliance. Users 115, 125, and 135 communicate with computing environment 100 using clients 110, 120, and 130 respectively. Computing environment 100 includes database 140 and 150, network 170, and identity store 160. Client 130 and database 140 communicate with identity store 160 via network 170. Administrator 165 and database 150 communicate directly, or via network 170, with identity store 160.

Clients 110, 120, and 130 can generally include any node on a network including computational capability, and including a mechanism for communicating across the network.

Databases 140 and 150 can generally include any type of system for storing data in non-volatile storage. This includes, but is not limited to, systems based upon magnetic, optical, and magneto-optical storage devices, as well as storage devices based on flash memory and/or battery-backed up memory.

Network 170 can generally include any type of wired or wireless communication channel capable of coupling together computing nodes. This includes, but is not limited to, a local area network, a wide area network, or a combination of networks. In one embodiment of the present invention, network 170 includes the Internet.

Identity store 160 can generally include any type of system for storing profiles and capabilities, and having the ability to map any form of identification to a profile or capability. This includes, but is not limited to, a system which maps a digital certificate to a profile, and a system which maps a user's login name to a profile.

In one embodiment of the present invention, administrator 165 defines enterprise profiles which include the capabilities granted to users 115, 125, and 135 by the administrator 165. Administrator 165 also defines the mapping rules which are used to determine which enterprise profile should be returned to a system, such as client 110, upon receiving a digital certificate from a user, such as user 115.

For example, suppose in one embodiment of the present invention, user 125 needs to access database 150. First, user 125 interacts with client 120 to communicate with database 150. Database 150 must determine what capabilities should be granted to user 125 and therefore requests user 125's digital certificate. This digital certificate serves the dual role of authenticating user 125 and establishing what capabilities are to be granted to user 125. Database 150 sends the digital certificate from user 125 to identity store 160. Identity store 160 uses a mapping rule defined by administrator 165 to locate the enterprise profile defined for user 125.

Identity store 160 subsequently returns the enterprise profile to database 150. This enterprise profile provides an indication of the capabilities that database 150 should grant user 125. In one example, the enterprise profile indicates to database 150 that user 125 should have read access but not write access to database 150.

Digital Certificate Provisioning

Figure 2:
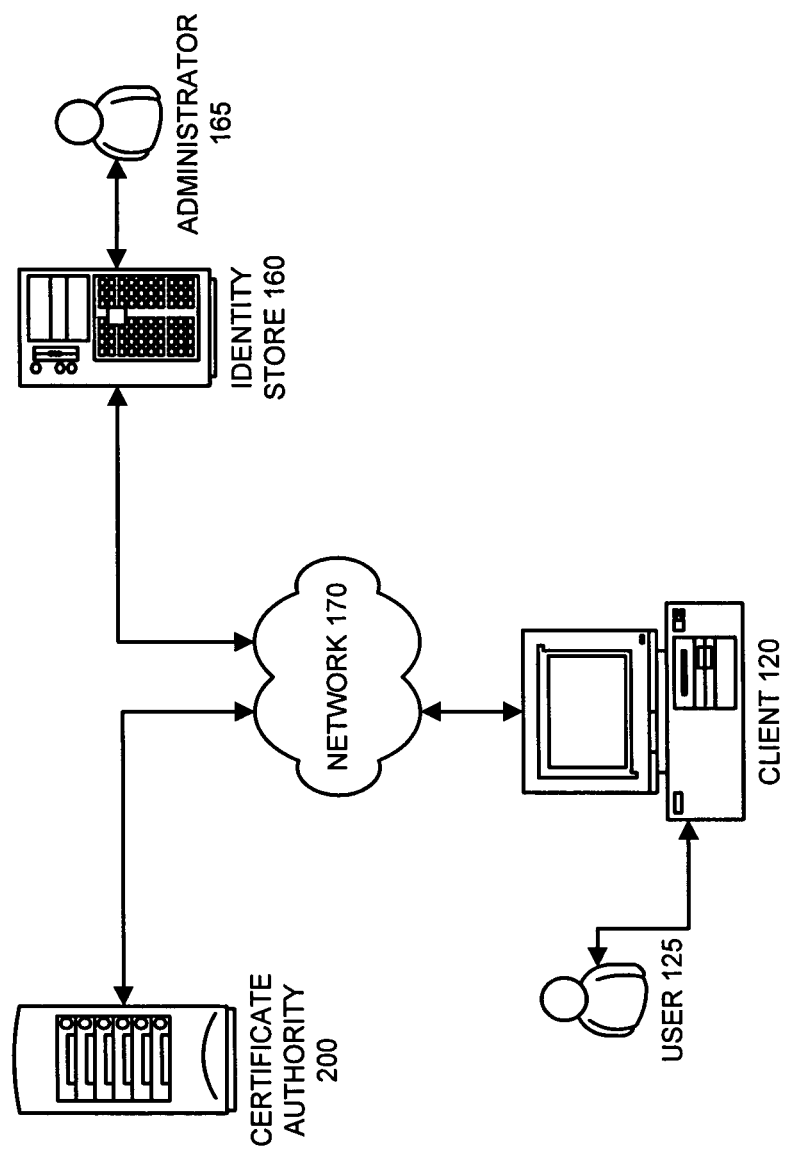
FIG. 2 illustrates communication with a certificate authority in accordance with an embodiment of the present invention.

FIG. 2 illustrates communication with a certificate authority 200 in accordance with an embodiment of the present invention. Certificate authority 200 can generally include any service that will authenticate a user and provision a digital certificate to the user that the user can in turn present to other users and systems to prove his or her identity. The digital certificate provisioned by certificate authority 200 indicates that certificate authority 200 has authenticated the user.

For example, user 125 wishes to obtain a digital certificate that will allow user 125 to obtain a set of capabilities. User 125 contacts certificate authority 200, via client 120, and requests a digital certificate. Upon authenticating user 125, certificate authority 200 provisions a digital certificate, and administrator 165 associates a capability with the digital certificate. Note that waiting until after user 125 is authenticated by certificate authority 200 to associate capabilities with user 125 helps prevent user 125 from posing as a second user because both certificate authority 200 and administrator 165 must be duped or user 125 must be able to steal the second user's certificate.

Digital Certificates

Figure 3:
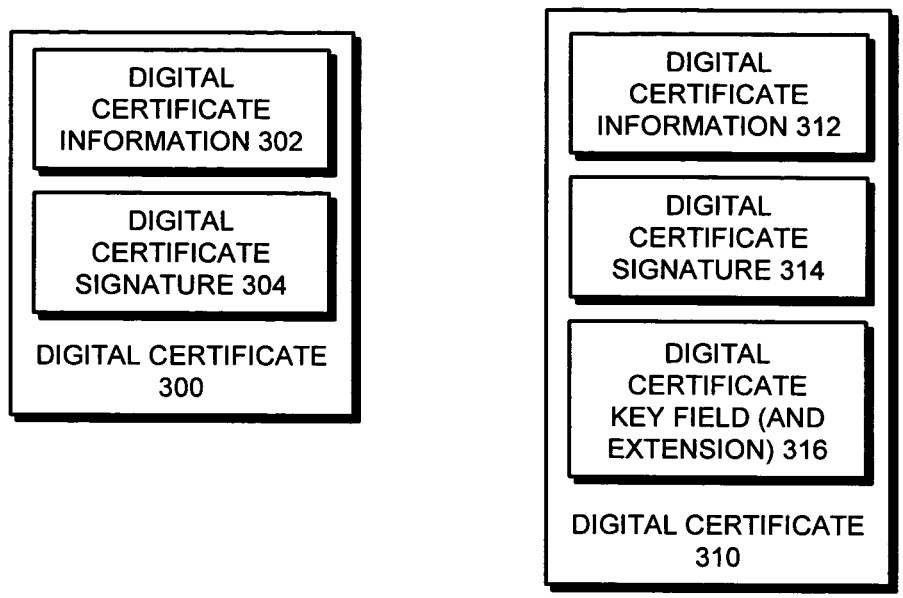
FIG. 3 illustrates a number of digital certificates in accordance with an embodiment of the present invention.

FIG. 3 illustrates a number of digital certificates in accordance with an embodiment of the present invention. Digital certificate 300 includes digital certificate information 302 and digital certificate signature 304. Digital certificate signature 304 is a signature provided by the certificate authority certifying the user's identity. Digital certificate information 302 includes information typically published with a digital certificate, such as the name of the user, and the expiration date of the digital certificate.

Digital certificate 310 similarly includes digital certificate information 312 and digital certificate signature 314. However, digital certificate 310 differs from digital certificate 300 in that digital certificate 310 also defines "digital certificate key field 316". The value in digital certificate key field 316 is used by the digital certificate mapping rules to identify the enterprise user profile associated with the digital certificate. Any field that is part of digital certificate information 312 can be designated as digital certificate key field 316. Furthermore, more than one field can be designated as a digital certificate key field. Moreover, digital certificate key field 316 can be an entirely new field that is not part of digital certificate field 312, but is instead an administrator defined field. This administrator defined field is a custom extension created specifically for use by the identity store. In general, all of the digital certificate key fields are designated as such by an administrator.

In one embodiment of the present invention, extensions can be used to attribute additional information or attribute with a certificate or an enterprise profile.

The digital certificates facilitate in identifying the capabilities that are given to a user. In one embodiment of the present invention, capabilities can be encoded in the digital certificates as digital certificate key field 316, or as part of digital certificate information 302 and 312.

Mapping Rules

Figure 4:
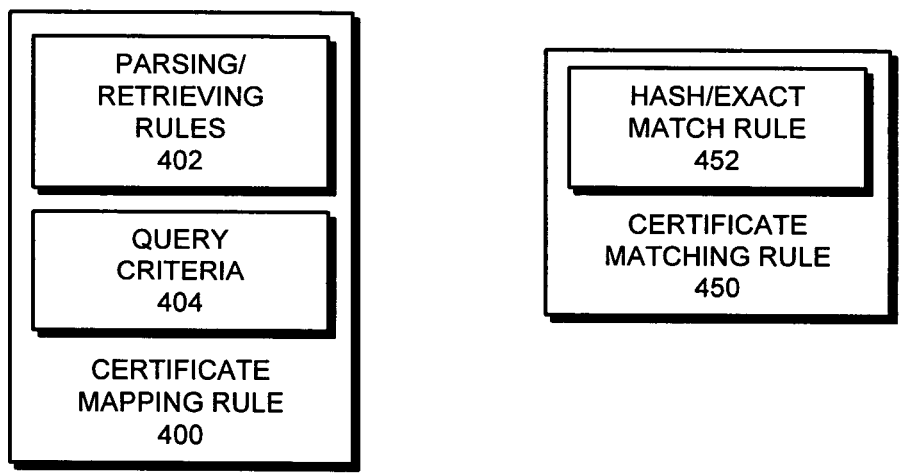
FIG. 4 illustrates a number of mapping rules in accordance with an embodiment of the present invention.

FIG. 4 illustrates a number of mapping rules in accordance with an embodiment of the present invention. The mapping rules specify how to retrieve an enterprise profile based on a received digital certificate. Any rule or mapping technique that can be used to associate a profile with a digital certificate can be used as a mapping rule. Mapping rules 400 and 450 are two such examples, but they are not the only possibilities. Note that a matching rule is also considered a mapping rule in the instant application.

Certificate mapping rule 400 comprises two parts: parsing/retrieving rules 402, and query criteria 404. Parsing/retrieving rules 402 specifies how a digital certificate presented by a user should be read. In other words, parsing rules 402 indicates how a digital certificate should be parsed. Query criteria 404 specifies how the identity store should be queried and what the identity store should be queried for. The query criteria 404 uses information obtained using parsing/retrieving rules 402 from the digital certificate to assist in the querying of the identity store for an enterprise profile.

In one embodiment of the present invention, if mapping rule 400 fails to identify an enterprise profile matching query criteria 404, mapping rule 400 can refer to an additional mapping rule.

Certificate matching rule 450 is comprised solely of hash/exact match rule 452. Hash/exact match rule 452 specifies the hashing formula to use on the received digital certificate. Once the digital certificate has been hashed, the digital certificate hash is used to identify a corresponding enterprise profile in the identity store. The present invention can use any hash rule including a binary hash of the entire digital certificate, or a hash based only on a few key fields.

In one embodiment of the present invention, hash/exact match rule 452 can include two rules. The first rule is a hash rule that searches for the enterprise profile by hashing the digital certificate and matching the hash values of the received digital certificate to the hash values of the previously stored digital certificate. The second rule is an exact match rule that searches for an associated enterprise profile by searching the identity store for the stored copy of the received digital certificate.

In one embodiment of the present invention, the matching rules can include just hash rules, just exact match rules, or both hash rules and exact match rules. If the system is configured to use both hash rules and exact match rules, the hash rules take precedence and are executed first.

In one embodiment of the present invention, hash/exact match rule 452 is only a hash rule.

In one embodiment of the present invention, if executing hash match rule 452 does not cause an enterprise profile to be identified, the identity store can execute the exact match rule. The ability to execute both types of rules provides an administrator with increased flexibility in rule management.

Identity Stores

Figure 5:
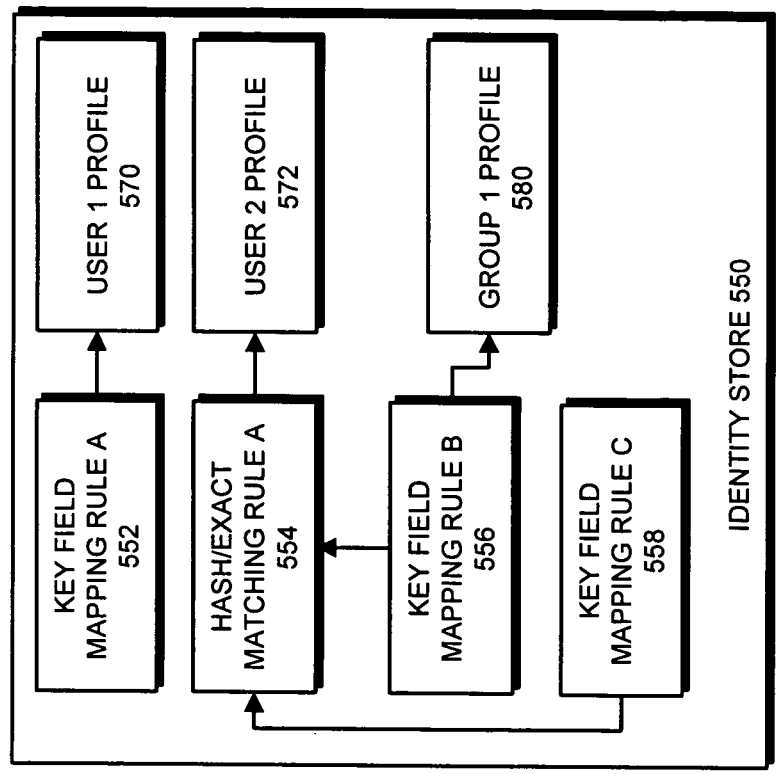
FIG. 5 illustrates a number of identity stores in accordance with an embodiment of the present invention.
Figure 5:
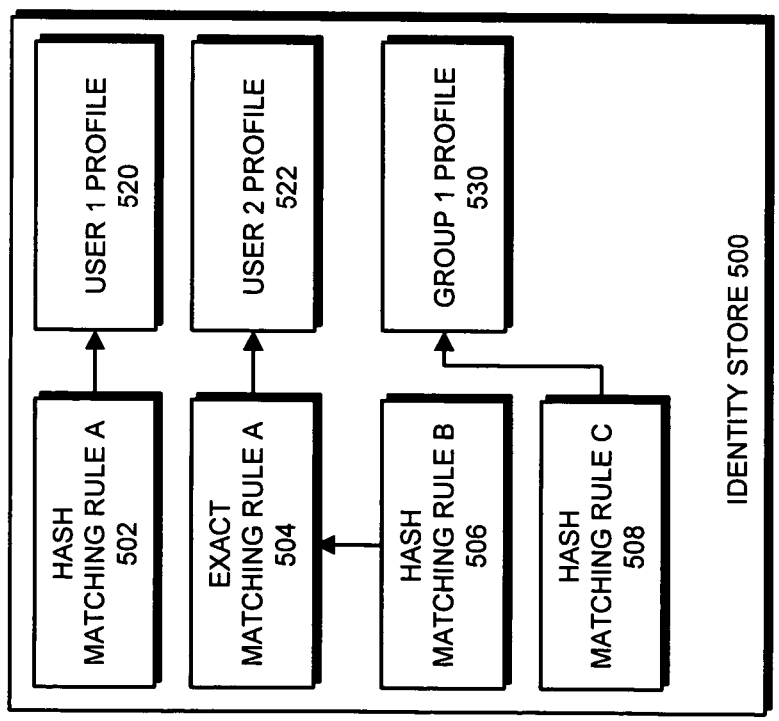

FIG. 5 illustrates a number of identity stores in accordance with an embodiment of the present invention. These identity stores are storage centers where the enterprise profiles are stored. These identity stores also store mapping rules and process the mapping rules when a digital certificate is received. Any system that has the capability to store a profile and to execute a mapping rule can be used as an identity store. Note that an identity store can also store group profiles, wherein group profiles give or restrict capabilities to several users that have been banded together by administrator defined criteria. Note that in the examples in FIG. 5, all the profiles are enterprise profiles; however, this is not a necessary restriction. In general, other types of profiles can be used.

Identity store 500 contains matching rules; 502, 504, 506, and 508. Given a corresponding certificate, hash matching rule A 502 will retrieve user 1 profile 520. On the other hand, hash matching rule B 506 will fail to retrieve a profile regardless of the received digital certificate because there are no profiles which have been stored based on the hashing rule specified in hash matching rule B 506. As a result, if a digital certificate is received that matches the criteria for using hash matching rule B 506, exact matching rule A 504 will be executed. If a digital certificate is received that matches exact matching rule A 504 the rule will be executed and if the digital certificate that was received is the one that is mapped to user 2 profile 522, then identity store 500 will return the enterprise profile, user 2 profile 522, to the user that supplied the digital certificate. If identity store 500 does not define a link between hash matching rule B 506 and exact matching rule A 504, and consequently hash matching rule B 506 fails to retrieve a profile, the profile retrieval process will end with no profile being returned. In one embodiment of the present invention, a special profile or value will be returned to indicate that a matching profile was not found.

If a digital certificate is received matching hash matching rule A 502 and identity store 500 determines that the digital certificate is mapped to user 1 profile 520, then user 1 profile 520 will be returned. Similarly, if a digital certificate is received that corresponds to hash matching rule C 508 and results in group 1 profile 530 being retrieved, then identity store 530 will return group 1 profile 530.

Identity store 550 includes both hash/exact matching rules and key field mapping rules. In this example, key field mapping rule A 552 results in user 1 profile 570 being retrieved, provided that a matching digital certificate is received at the identity store. Key field mapping rule C 558 does not result in any profile being selected, however, it does refer to hash/exact matching rule A 554. Hash/exact matching rule A 554 given a matching digital certificate will retrieve user 2 profile 572. If a matching digital certificate is received, key field mapping rule B 556 will execute and either group 1 profile 580 will be retrieved, or the digital certificate will be passed on to hash/exact matching rule A 554 in an attempt to find a matching profile.

When the identity store receives a digital certificate, a mapping rule is selected based on administrator-defined rules. Note that although several mapping rules may be able to process a digital certificate, only one mapping rule will successfully locate a profile that is mapped to the digital certificate. Also, note that the mapping rules can be prioritized by an administrator. Furthermore, an administrator can specify additional rules to narrow the search space.

Defining Mapping Rules

Figure 6:
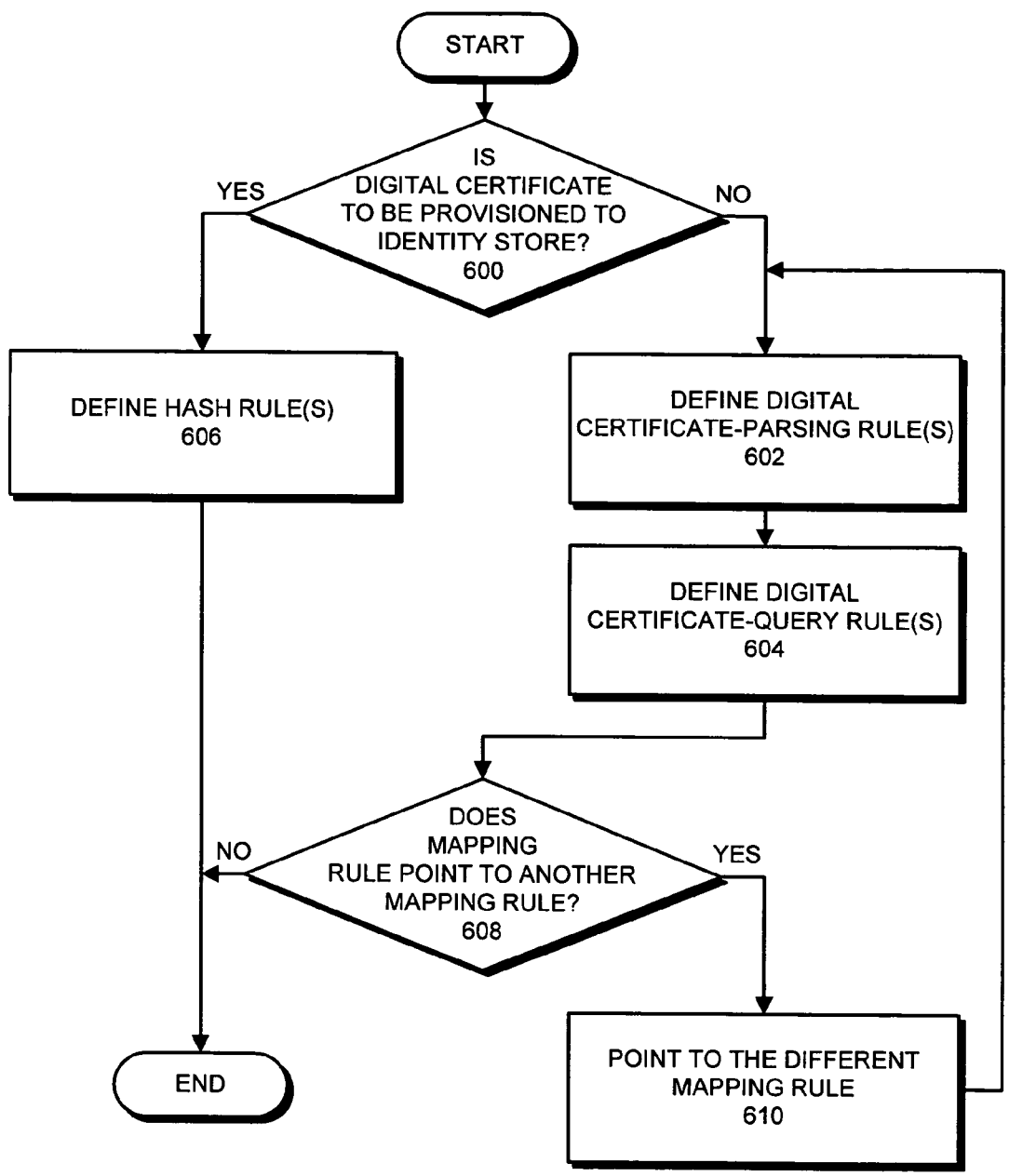
FIG. 6 presents a flowchart illustrating the creation of a mapping rule in accordance with an embodiment of the present invention.

FIG. 6 presents a flowchart illustrating the creation of a mapping rule in accordance with an embodiment of the present invention. The process begins by determining if the digital certificate is to be provisioned to the identity store (step 600). If so, hashing rules can be defined to determine which-enterprise profile will be mapped to a digital certificate (step 606). If not, the next step is to define the parsing rules that will be used to parse any digital certificates that are received at the identity store (step 602). In one embodiment of the present invention, defining hashing rules (step 606) includes defining exact match rules.

After the parsing rules have been defined, digital certificate query rules are defined (step 604). These digital certificate query rules specify what information is needed from the digital certificate and how that information should be used in order to identify the enterprise profile that should be retrieved from the identity store. Note that if the capabilities are encoded into the digital certificate, step 604 is not needed because the capabilities can be retrieved from the parsing rules that are defined in step 602.

Once a mapping rule has been defined, the next step is to determine whether the mapping rule should refer to a second mapping rule if the mapping rule should fail to retrieve an enterprise profile (step 608). If so, the mapping rule is given a pointer to a second mapping rule (step 610).

In one embodiment of the present invention, a mapping rule cannot refer to another mapping rule.

In one embodiment of the present invention a mapping rule does not refer to another mapping rule, but the mapping rule can have multiple query rules which are processed in a prioritized order.

Digital Certificate Provisioning

Figure 7:
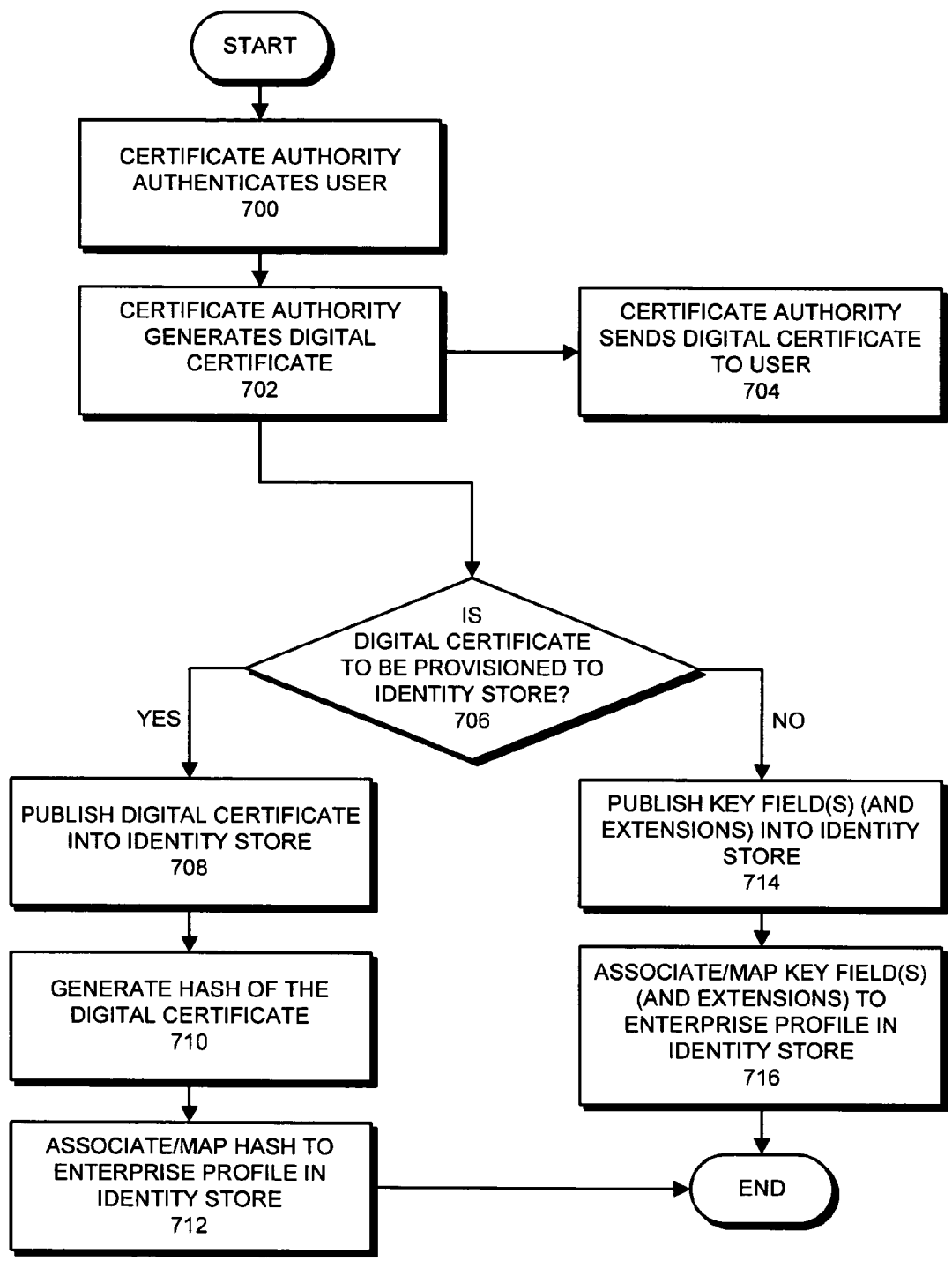
FIG. 7 presents a flowchart illustrating provisioning of a digital certificate in accordance with an embodiment of the present invention.

FIG. 7 presents a flowchart illustrating provisioning of a digital certificate in accordance with an embodiment of the present invention. Before a digital certificate can be provisioned to a user, the certificate authority must authenticate the user (step 700). Once the certificate authority has authenticated the user, the certificate authority generates a digital certificate (step 702). The digital certificate is then sent to the user (step 704).

In one embodiment of the present invention, the digital certificate is provisioned to the identity store. Therefore, the next step is to identify whether the digital certificate should be sent to the identity store (step 706). If so, the digital certificate is published into the identity store (step 708). Next, a hash of the digital certificate is generated (step 710). Lastly, the hash is associated or mapped to an enterprise profile in the identity store (step 712).

If the digital certificate is not to be provisioned to the identity store, the key fields of the digital certificate, as defined by an administrator, are published into the identity store (step 714). Lastly, the key fields of the digital certificate are mapped to an enterprise profile in the identity store (step 716).

In one embodiment of the present invention administrator defined extensions created for use by the identity store for certificate mapping and enterprise profile retrieval are published into the identity store (step 714) and then associated to the enterprise profile in the identity store (step 716).

Note that although the flowchart illustrates determining whether to map a hash or map key fields based upon whether the digital certificate is provisioned into the identity store, the two processes are not mutually exclusive. Using the present invention, it is possible to combine the use of key fields and hashing to develop rules for mapping a digital certificate to an enterprise profile.

Retrieval of a Hash Mapped Profile

Figure 8:
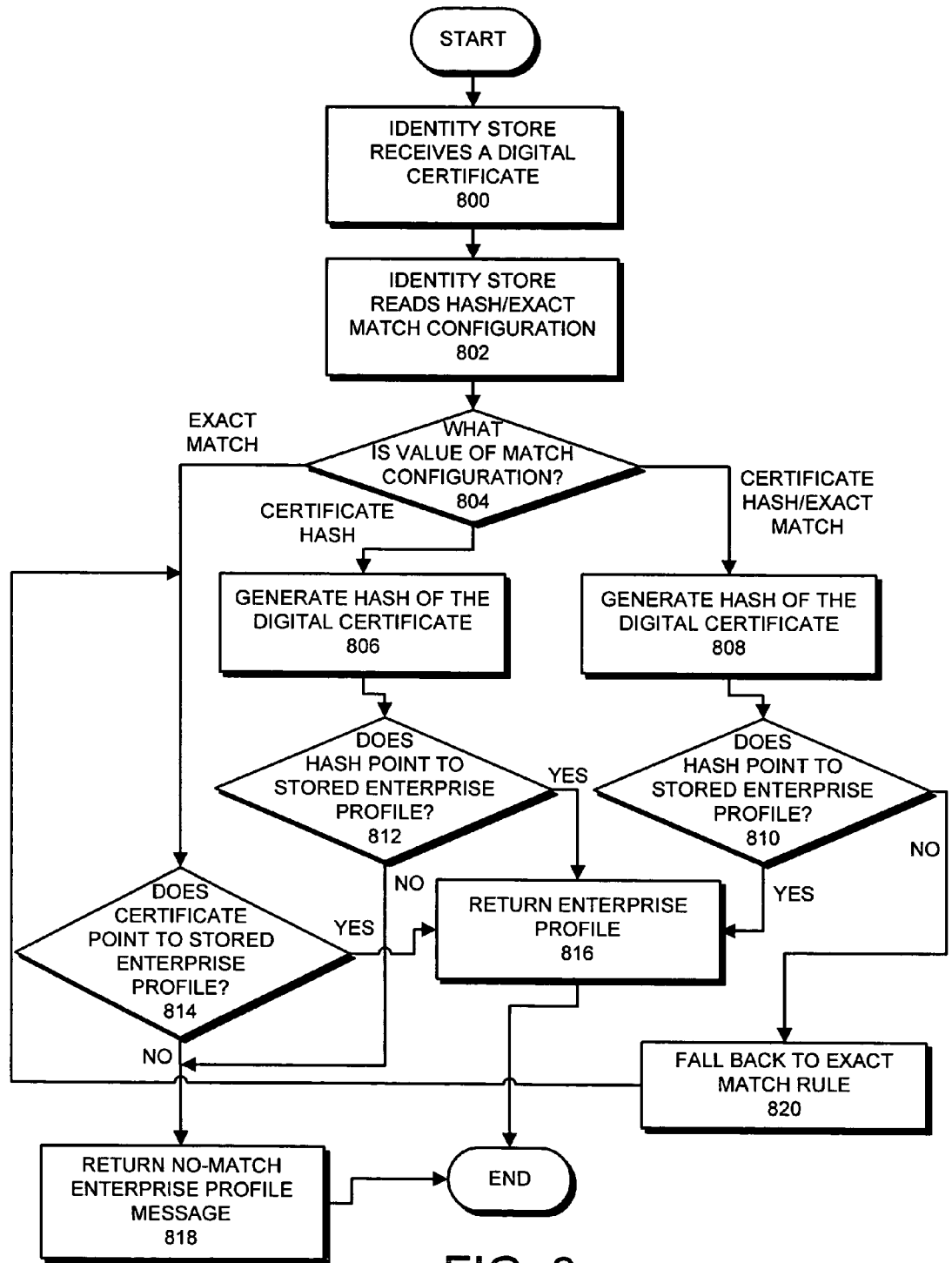
FIG. 8 presents a flowchart illustrating retrieval of an enterprise profile using hash mapping rules in accordance with an embodiment of the present invention.

FIG. 8 presents a flowchart illustrating retrieval of an enterprise profile using hash mapping rules in accordance with an embodiment of the present invention. The process begins when the identity store receives a digital certificate (step 800). The system then reads the hash/exact match configuration (step 802). This configuration can be included as a setting of the identity store. Next, the system determines the value of the match configuration (step 804). If the match configuration is exact match, then the system determines if the certificate points to a stored enterprise profile (step 814). If so, the system returns the matching enterprise profile (step 816). If not, the system returns a no-match enterprise profile message (step 818).

If the match configuration is certificate hash, the system generates a hash of the digital certificate (step 806). The system then determines if the hash points to a stored enterprise profile (step 812). If so, the enterprise profile is returned to the user or system that sent the digital certificate (step 816). If not, the system returns a no-match enterprise profile message (step 818).

If the match configuration is certificate hash/exact match, the system generates a hash of the digital certificate (step 808). The system then determines if the hash points to a stored enterprise profile (step 810). If so, the enterprise profile is returned to the user or system that sent the digital certificate (step 816). If not, the system falls back to the exact match rule and follows the same process as the exact match configuration (step 820).

Note that the match configuration values can be alphanumeric, pointers to processes, or any other method for distinguishing between system configurations.

Retrieval of a Key Field Mapped Profile

Figure 9:
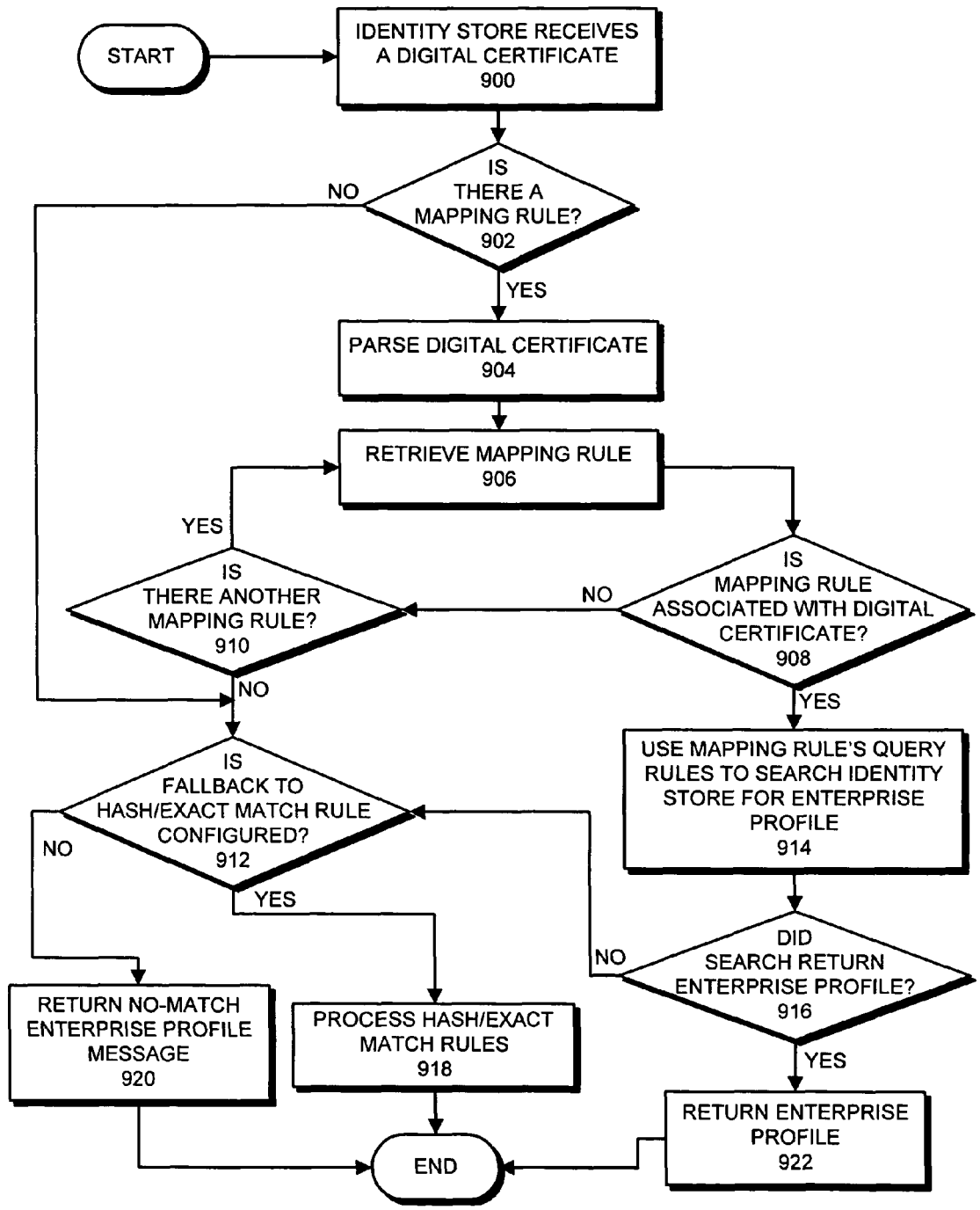
FIG. 9 presents a flowchart illustrating retrieval of an enterprise profile using key field mapping rules in accordance with an embodiment of the present invention.

FIG. 9 presents a flowchart illustrating retrieval of an enterprise profile using key field mapping rules in accordance with an embodiment of the present invention. Similarly to retrieving an enterprise profile using hash mapping rules, the process begins when the identity store receives a digital certificate (step 900). The system then checks if there is a key field mapping rule (step 902). If not, the system determines if fallback to hash/exact matching rule is configured (step 912) and if so, the system process the hash/exact match rules (step 918) as illustrated in FIG. 8 of the instant application. If not, the system returns a no-match enterprise profile message (step 920).

If the system determines that there is a mapping rule, the system parses the digital certificate (step 904). The system then retrieves a mapping rule (step 906). In one embodiment of the present invention, the system retrieves the first mapping rule in a list of mapping rules.

In another embodiment of the present invention, the system uses information obtained by parsing the digital certificate to determine which mapping rule to retrieve.

After retrieving the mapping rule, the system determines if the mapping rule is associated with the digital certificate (step 908). If not, the system checks to see if there is another mapping rule (step 910). If there is another mapping rule, the system returns to step 906. If there is not another mapping rule, the system proceeds to step 912.

If the mapping rule is associated with the digital certificate, the system uses the mapping rule's query rules to search the identity store for an enterprise profile that is associated with the digital certificate (step 914). The system then determines if the identity store located an enterprise profile (step 916). If so, the enterprise profile is returned to the user or system that sent the digital certificate (step 922). If not, the system proceeds to step 912.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method comprising:
searching, in an identity store by a computer system using administrator-defined rules, for a certificate mapping rule that corresponds to a digital certificate, wherein the certificate mapping rule comprises:
a digital certificate-parsing rule that specifies rules used to parse the digital certificate; and
a digital certificate-querying rule that specifies query criteria used to query the identity store;
parsing the digital certificate, using the digital certificate-parsing rule, to obtain parsed certificate information; and
querying the identity store, using the query criteria and the parsed certificate information, to retrieve an enterprise profile that is mapped to the digital certificate; and
controlling the user's access to the enterprise resources based on capacities indicated by the retrieved enterprise profile.

2. The method of claim 1, further comprising:
receiving the digital certificate from the certificate authority at the computer system, wherein the certificate authority authenticates the user and generates the digital certificate upon user authentication.

3. The method of claim 2, further comprising:
sending the digital certificate to the identity store; and
sending the user's identifying information to the identity store, wherein the user's identifying information maps the digital certificate to the enterprise profile.

4. The method of claim 2, further comprising:
sending a value of the key field to the identity store, wherein the value identifies the enterprise profile associated with the digital certificate; and
sending the user's identifying information to the identity store, wherein the user's identifying information maps the digital certificate to the enterprise profile.

5. The method of claim 4, wherein the key field comprises:
a standard digital certificate field; or
a standard or custom extension created specifically for use by the identity store.

6. The method of claim 3, further comprising generating a hash of the digital certificate at the identity store using the hash formula to facilitate in identifying the enterprise profile associated with the digital certificate.

7. The method of claim 1, wherein the certificate mapping rule refers to a second mapping rule, and the method further comprises:
responsive to no enterprise profile being retrieved upon executing the certificate mapping rule, applying the second mapping rule to retrieve the enterprise profile that is mapped to the digital certificate.

8. The method of claim 1, further comprising:
responsive to no mapping rule being returned from the search, using a hash formula on the received digital certificate to retrieve the enterprise profile.

9. A non-transitory computer-readable storage medium storing instructions that when executed by a computer cause the computer to perform a method for associating a digital certificate with an enterprise profile, the method comprising:
searching in an identity store, using administrator-defined rules, for a certificate mapping rule that corresponds to the digital certificate, wherein the certificate mapping rule comprises:
a digital certificate-parsing rule that specifies rules used to parse the digital certificate; and
a digital certificate-querying rule that specifies query criteria used to query the identity store;
parsing the digital certificate, using the digital certificate-parsing rule, to obtain parsed certificate information; and
querying the identity store, using the query criteria and the parsed certificate information, to retrieve the enterprise profile that is mapped to the digital certificate; and
controlling the user's access to the enterprise resources based on the capacities indicated by the retrieved enterprise profile.

10. The computer-readable storage medium of claim 9, wherein the method further comprises:
receiving the digital certificate from the certificate authority at the computer, wherein the certificate authority authenticates the user and generates the digital certificate upon user authentication.

11. The computer-readable storage medium of claim 10, wherein the method further comprises:
sending the digital certificate to the identity store; and
sending the user's identifying information to the identity store, wherein the user's identifying information maps the digital certificate to the enterprise profile.

12. The computer-readable storage medium of claim 10, wherein the method further comprises:
sending a value of the key field to the identity store, wherein the value identifies the enterprise profile associated with the digital certificate; and
sending the user's identifying information to the identity store, wherein the user's identifying information maps the digital certificate to the enterprise profile.

13. The computer-readable storage medium of claim 12, wherein the key field comprises:
a standard digital certificate field; or
a standard or custom extension created specifically for use by the identity store.

14. The computer-readable storage medium of claim 8, wherein the method further comprises generating a hash of the digital certificate at the identity store using the hash formula to facilitate in identifying the enterprise profile associated with the digital certificate.

15. The computer-readable storage medium of claim 9, wherein the certificate mapping rule refers to a second mapping rule, and the method further comprises:
responsive to no enterprise profile being retrieved upon executing the certificate mapping rule, applying the second mapping rule to retrieve the enterprise profile that is mapped to the digital certificate.

16. The computer-readable storage medium of claim 9, wherein the method further comprises:
responsive to no mapping rule being returned from the search, using a hash formula on the received digital certificate to retrieve the enterprise profile.

17. An apparatus for associating a digital certificate with an enterprise profile, the apparatus comprising:
a processor;
a memory comprising an identity store;
a searching mechanism coupled to the processor to search in the identity store, using administrator-defined rules, for a certificate mapping rule that corresponds to the digital certificate, wherein the certificate mapping rule comprises:
a digital certificate-parsing rule that specifies rules used to parse the digital certificate; and
a digital certificate-querying rule that specifies query criteria used to query the identity store;
a retrieving mechanism, configured to:
parse the digital certificate, using the digital certificate-parsing rule, to obtain parsed certificate information; and
query the identity store, using the query criteria and the parsed certificate information, to retrieve the enterprise profile that is mapped to the digital certificate; and
a controlling mechanism configured to control the user's access to the enterprise resources based on the capacities indicated by the retrieved enterprise profile.

18. The apparatus of claim 17, wherein the sending mechanism is further configured to:
send the digital certificate to the identity store; and
send the key field to the identity store, wherein the key field facilitates in identifying the enterprise profile associated with the digital certificate; and send the user's identifying information to the identity store.

19. The apparatus of claim 16, further comprising a hash-generating mechanism configured to generate a hash of the digital certificate at the identity store using the hash formula to facilitate in identifying the enterprise profile associated with the digital certificate.

20. The apparatus of claim 17, wherein responsive to no mapping rule being returned from the search, the retrieving mechanism is further configured to use a hash formula on the received digital certificate to retrieve the enterprise profile.

\* \* \* \* \*

UNITED STATES PATENT AND TRADEMARK OFFICE
CERTIFICATE OF CORRECTION

| | | |
|---|---|---|
| PATENT NO. | : 8,701,168 B2 | Page 1 of 1 |
| APPLICATION NO. | : 11/285518 | |
| DATED | : April 15, 2014 | |
| INVENTOR(S) | : Sastry et al. | |

It is certified that error appears in the above-identified patent and that said Letters Patent is hereby corrected as shown below:

In the Claims

In column 12, line 12, in Claim 17, delete "mechanism," and insert -- mechanism --, therefor.

Signed and Sealed this
Ninth Day of September, 2014

Michelle K. Lee
*Deputy Director of the United States Patent and Trademark Office*